(12) United States Patent
Ohwada et al.

(10) Patent No.: US 6,295,150 B1
(45) Date of Patent: Sep. 25, 2001

(54) WAVELENGTH DIVISION MULTIPLEXING DEVICE

(75) Inventors: Hisashi Ohwada; Toshihiko Takano; Norio Takeda; Kuniaki Jinnai, all of Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/412,615

(22) Filed: Oct. 6, 1999

(30) Foreign Application Priority Data

Oct. 6, 1998 (JP) .................................................. 10-284181

(51) Int. Cl.$^7$ .................................................... H04J 14/02
(52) U.S. Cl. ........................... 359/130; 359/124; 359/133; 359/179; 359/154; 359/127; 359/855; 359/590; 359/589; 359/583; 359/634
(58) Field of Search ...................................... 359/124, 130, 359/133, 179, 154, 127, 885, 590, 589, 583, 634

(56) References Cited

U.S. PATENT DOCUMENTS

| | | | |
|---|---|---|---|
| 3,722,977 | * | 3/1973 | Sloane ...................................... 350/1 |
| 3,722,978 | * | 3/1973 | Sloane et al. ............................. 350/1 |
| 4,636,078 | * | 1/1987 | Podvin .................................. 356/359 |
| 5,870,513 | * | 2/1999 | Williams ................................ 385/24 |
| 5,933,553 | * | 8/1999 | Ziemann ................................ 385/24 |

* cited by examiner

*Primary Examiner*—Leslie Pascal
*Assistant Examiner*—Chau M. Nguyen
(74) *Attorney, Agent, or Firm*—Wenderoth, Lind & Ponack, L.L.P.

(57) ABSTRACT

A wavelength division multiplexing device which can easily utilize existing optical fibers for increasing the transmission capacity by approximately several fold mainly in a short-range information communication network, comprising, as essential elements, a pair of 1×N optical couplers ($2 \leq N \leq 16$), N light emission devices in which one of peak wavelengths thereof differs from every other one by at least 30 nm and N light receivers having optical filters having light-transmission wavelength bands adjusted to correspond to said peak wavelengths, wherein the light emission devices and the light receivers having optical filters corresponding to peak wavelengths of the light emission devices form pairs, and said light emission devices of said light receivers are optically connected to N-port-side ports of one of the 1×N optical couplers.

6 Claims, 4 Drawing Sheets

WAVELENGTH DIVISION MULTIPLEXING DEVICE

FIELD OF THE INVENTION

The present invention relates to a wavelength division multiplexing device which is useful as means for remarkably increasing transmission information when used for transmitting light signals in optical communication, optical LAN and optical measurement control.

PRIOR ART OF THE INVENTION

In recent years, with remarkable improvements in performances of personal computers and rapidly increasing diffusion of internet, information handled in information networks such as optical communication and optical LAN is markedly increasing in amount. For increasing the transmission capacity of lines for the above increased information, there is one method in which more optical fibers are laid. However, the above method is not expedient since it requires a large amount of a cost. Recently, there is therefore rapidly developing a wavelength division multiplexing method in which existing optical fibers are used and lights having different wavelengths are multiplexed and transmitted to increase the capacity. The above method is epochal as a low-cost method, since the transmission capacity per wavelength is the same as in a conventional method so that the transmission capacity can be remarkably increased with an increase in the number of wavelengths to be multiplexed.

In a wavelength division multiplexing method generally employed by communication service carriers, however, the increased number of wavelengths is gained by using wavelengths having intervals of the order of approximately 1 nm in order to increase the transmission capacity to a great extent, so that a wavelength division multiplexer and parts constituting it have required very high-degree control.

For example, a laser diode (LD) causes a shift in light wavelength depending upon temperatures, and it is therefore required to maintain the temperature of the device at a constant temperature. Further, when an optical filter is used, it also requires very strict control. Due to these, the wavelength division multiplexer is inevitably expensive.

SUMMARY OF THE INVENTION

It is an object of the present invention to provide a wavelength division multiplexing device which can easily utilize existing optical fibers and increases the transmission capacity to make it approximately several times mainly in a short-range information communication network.

According to the present invention, there is provided a wavelength division multiplexing device comprising, as essential elements, a pair of 1×N optical couplers ($2 \leq N \leq 16$), N light emission devices in which one of peak wavelengths thereof differs from every other one by at least 30 nm and N light receivers having optical filters having light-transmission wavelength bands adjusted to correspond to said peak wavelengths, wherein the light emission devices and the light receivers having optical filters corresponding to peak wavelengths of the light emission devices form pairs, said light emission devices or said light receivers are optically connected to N-port-side ports of one of the 1×N optical couplers, and each optical filter is defined by the following expression (1), $$|\lambda - \lambda_h| \geq 0.01\lambda + 2 \text{(nm)} \quad (1)$$

wherein $\lambda$ (nm) is a light wavelength of a light emission device, which is to form a pair with an optical filter, at a room temperature, and $\lambda_h$ (nm) is a wavelength corresponding to 50% of transmittance of the optical filter in an optical absorption curve near $\lambda$.

DETAILED DESCRIPTION OF THE INVENTION

Figure 1:
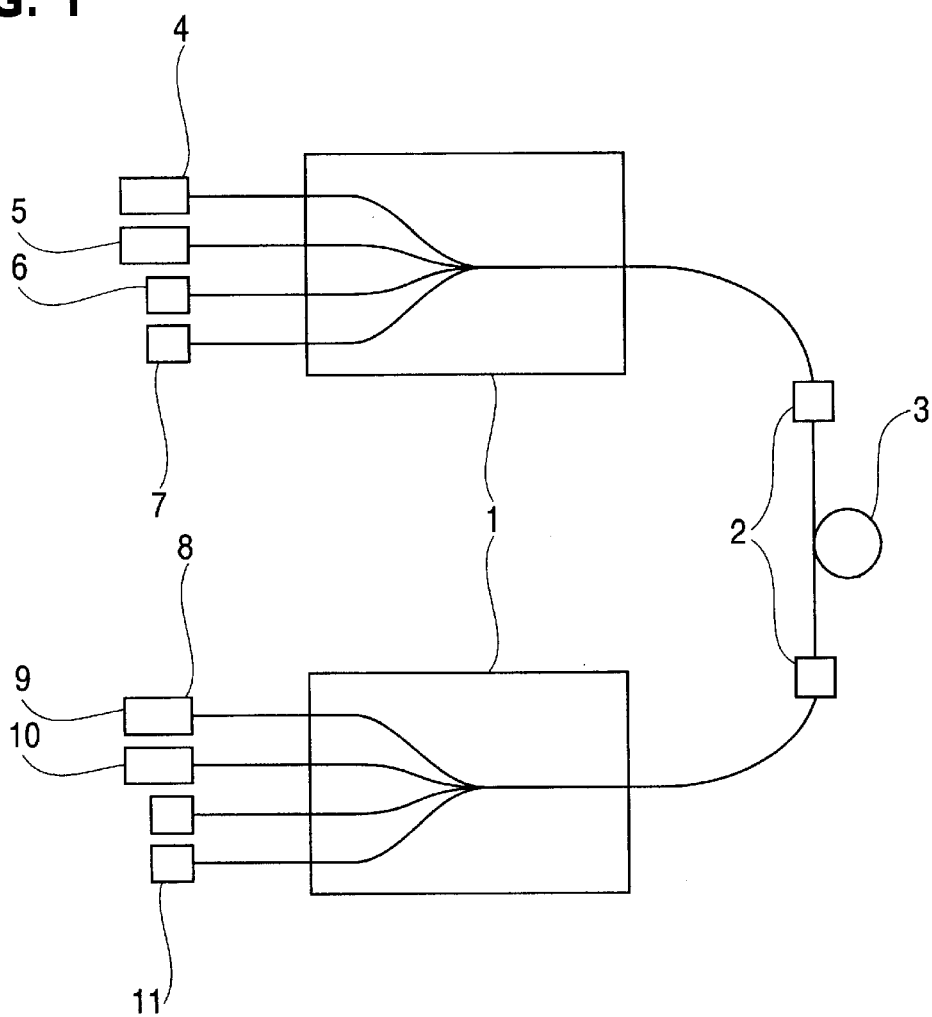
FIG. 1 schematically shows a four-wavelength division multiplexing device prepared in Example 1.

The present inventors have made diligent studies for achieving the above object and as a result have found that the above object is achieved by using optical couplers for multiplexing light waves and separating light waves, securing intervals of peak wavelengths of light emission devices to make them larger than a predetermined value and bringing half-value widths of an optical absorption curve in transmission wavelength bands of optical filters into a predetermined range.

When the present invention is practiced, the 1×N optical couplers are not specially limited, while they are preferably optical waveguides formed of a polymer film having a refractive index distribution formed. The branching number N of the polymer waveguides is preferably at least 2 and does not exceed 16. When it exceeds 16, undesirably, the intensity of branched light comes to be insufficient.

Although not specially limited, the light emission devices are preferably devices which have a clear peak wavelength and which are almost free of, or substantially free of, wavelengths outside the peak wavelength. From the above point of view, in the present invention, preferably, the light emission devices are laser diodes each of which has a condenser lens before each light emission side thereof, and the light receivers are photodiodes. Other light emission devices such as light-emitting diodes (LED) are undesirable since they are required to be combined with optical filters so that the number of parts increases and since the quantity of light is liable to be insufficient.

The light emission devices are preferably selected so as to have peak wavelengths of from a 800 nm band to 1,550 nm band in view of light transmittance, etc., of optical fibers.

When the present invention is practiced, the optical filters are not specially limited so long as they are selected so as to satisfy the above expression (1). The present invention can use any one of a long wavelength path filter, a band path filter and a short wavelength path filter.

However, commercially available optical filters do not guarantee the transmission and shielding performances in required entire wavelength region and have inherent wavelength dependency. When a selected light emission device has a light emission region broader than the transmission and shielding wavelength region guaranteed by an individual optical filter, the transmission and shielding performances in a predetermined wavelength region are studied with regard to the individual optical filter, and filters of two kinds or more are combined as required for attaining predetermined performances.

When the light emission device is a laser diode, the size of variability of peak wavelength thereof is generally approximately ±5 nm, and the peak wavelength of the light emission device shifts at a temperature of 0 to 50° C. which is an environmental temperature range of use. The wavelength shift of peak wavelength of the light emission device depending upon a change in temperature differs depending upon wavelength bands. For example, temperature coefficients of wavelength shift of light emission of a laser diode is approximately 0.2 nm/° C. at a wavelength of less than 900 nm, approximately 0.3 nm/° C. at a wavelength of from 900 nm to 1,200 nm, and approximately 0.4 nm at a wavelength of longer than 1,200 nm.

The optical filter is essentially required to fully transmit light from a predetermined light emission device even when the peak wavelength varies as described above and when the wavelength shifts depending upon a change in temperature.

Therefore, each filter is characteristically required to satisfy the above expression (1) where $\lambda$ is a light wavelength of a light emission device, which is to form a pair with the optical filter, at a room temperature, and $\lambda_h$ is a wavelength corresponding to 50% of transmittance in an optical absorption curve near $\lambda$.

Figure 4:
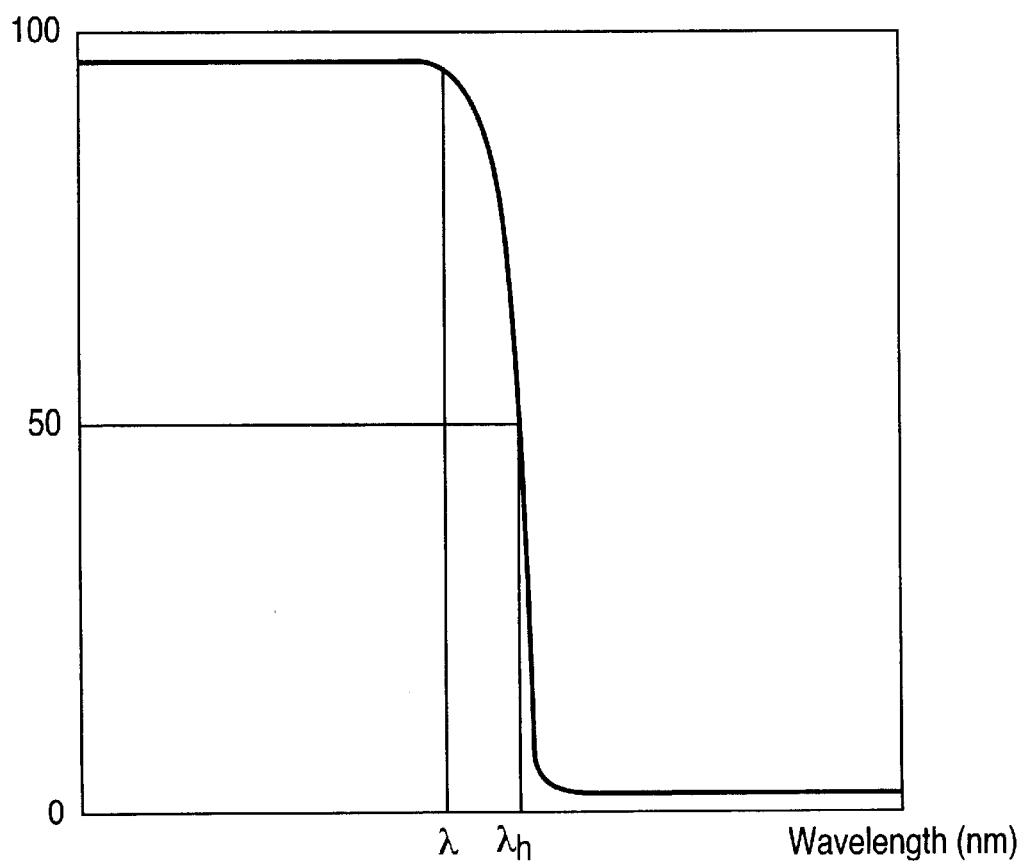
FIG. 4 schematically shows relationships among a transmission curve, $\lambda$ and $\lambda_h$ of a short wavelength path filter.
Figure 5:
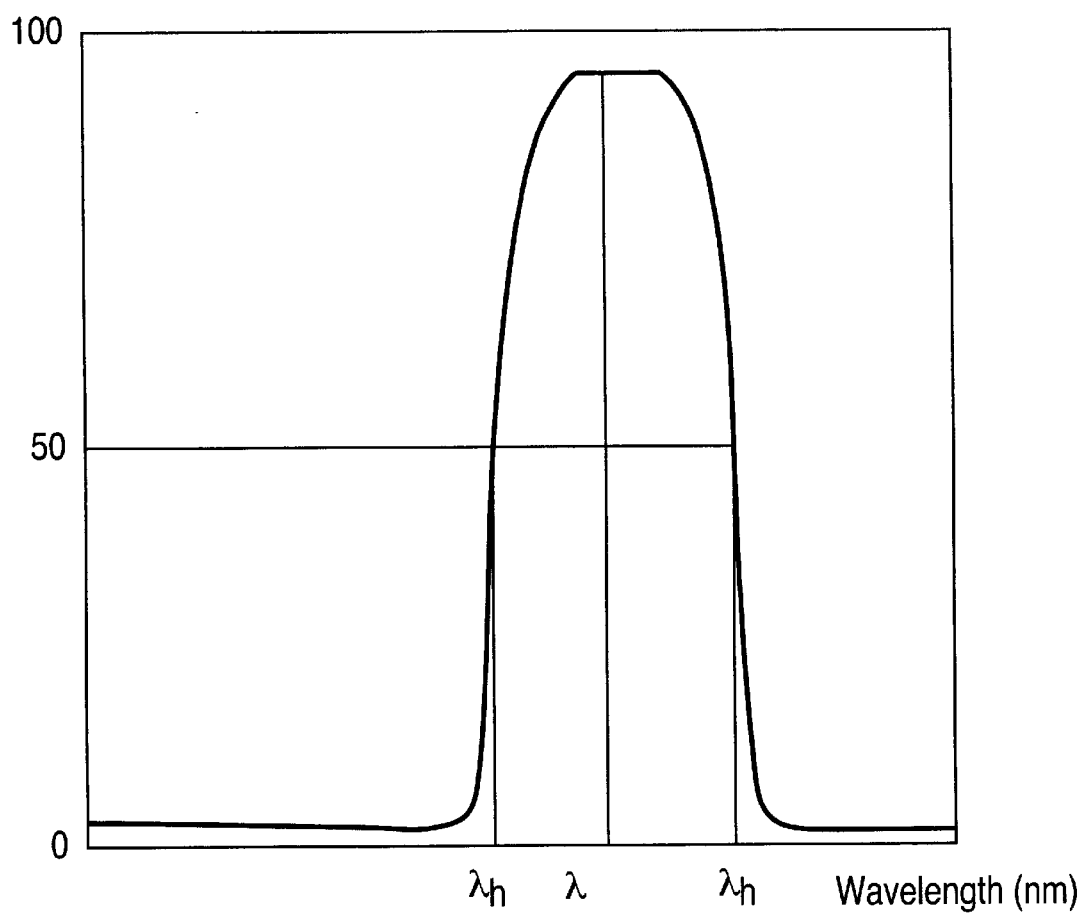
FIG. 5 schematically shows relationships among a transmission curve, $\lambda$ and $\lambda_h$ of a band path filter.
Figure 6:
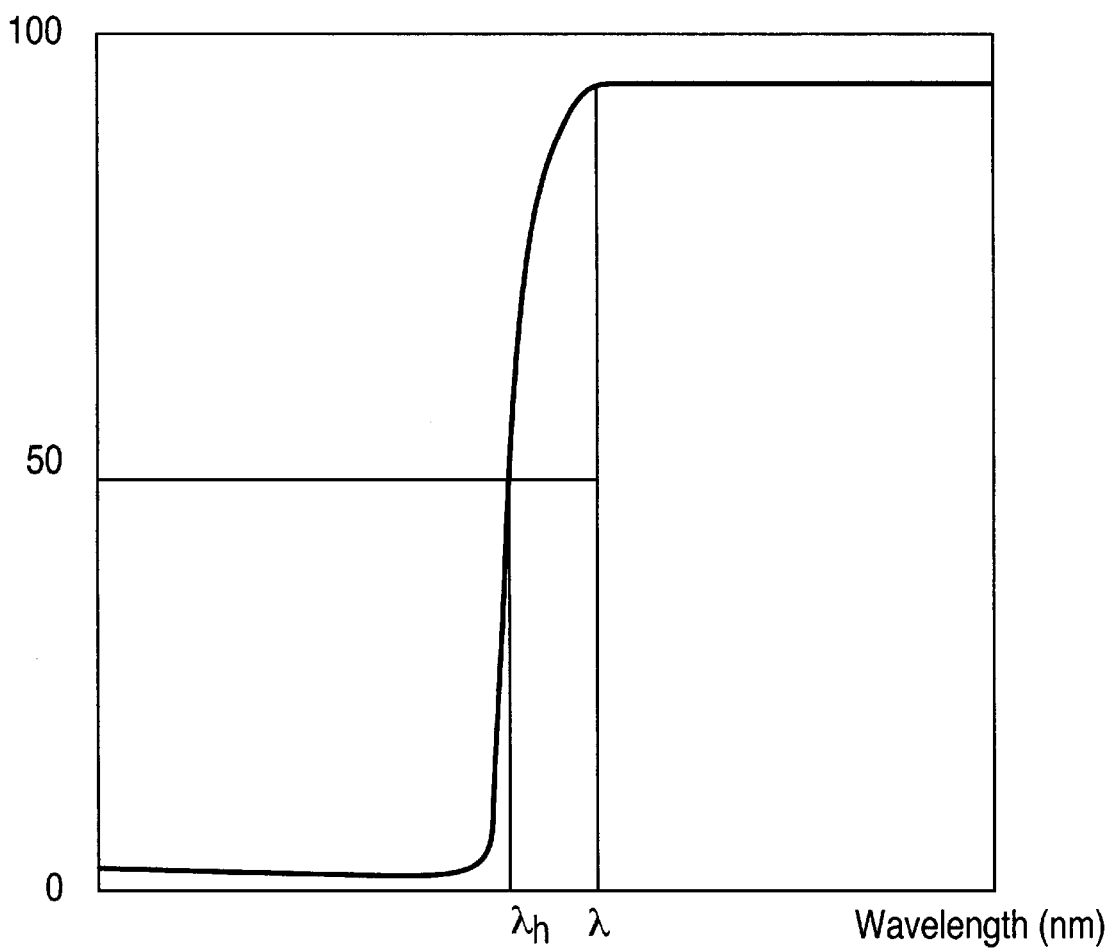
FIG. 6 schematically shows relationships among a transmission curve, $\lambda$ and $\lambda_h$ of a long wavelength path filter.

With regard to the above point, FIGS. 4, 5 and 6 show relationships among light transmission curve, $\lambda$ and $\lambda_h$ concerning a short wavelength path filter (to be abbreviated as "SPF" hereinafter), a band path filter (to be abbreviated as "BPF" hereinafter) and a long wavelength path filter (to be abbreviated as "LPF" hereinafter).

According to the expression (1), it is required to select light emission devices such that wavelengths of lights to be transmitted through optical filters provided in the light receivers do not overlap one another, and in view of this point, the light emission devices are different from every other one such that one of peak wavelengths thereof differs from every other one by at least 30 nm.

EXAMPLES

The wavelength division multiplexing device of the present invention will be more specifically explained with reference to Examples hereinafter.

The following Examples are illustrated for specifically explaining the present invention and are not intended for imposing limitations on the embodiment and scope of the present invention.

Example 1

FIG. 1 schematically shows a wavelength division multiplexing device of Example 1.

In FIG. 1:

Symbol 1 indicates a 50/125 GI 1×4 coupler for optical fibers, supplied by Mitsubishi Gas Chemical Co., Inc., in which 50/125 GI (which means a core diameter of 50 μm and a cladding diameter of 125 μm) optical fibers are connected to ports.

Symbol 2 indicates a optical connector.

Symbol 3 indicates a 20 m long 50/125 GI optical fiber coupled with the 1×4 coupler through the optical connector (2).

Symbol 4 indicates a 1,260 nm laser diode block (see FIG. 2, laser diode blocks hereinafter have the same structures) which is integrated with a gradient index lens (a trade name: "SELFOC" lens) and coupled with a 50/125 GI optical fiber through a ferrule.

Symbol 5 indicates a 1,350 nm laser diode block.

Symbol 6 indicates a photodiode block (see FIG. 3, photodiode blocks hereinafter have the same structure) which is integrated with an optical filter (BPF type) forming a pair with a 1,310 nm laser diode and is coupled with a 50/125 GI optical fiber through a ferrule.

Symbol 7 indicates a photodiode block having an optical filter (LPF type) forming a pair with a 1,550 nm laser diode.

Symbol 8 indicates a 1,310 nm laser diode block.

Symbol 9 indicates a 1,550 nm laser diode block.

Symbol 10 indicates a photodiode block having an optical filter (SPF type) forming a pair with a 1,260 nm laser diode.

Symbol 11 indicates a photodiode block having an optical filter (BPF type) forming a pair with a 1,350 nm laser diode.

The above laser diodes were supplied by Mitsubishi Electric Corp., the above optical filters were supplied by OYOKODE Lab Co., Ltd., and the above photodiodes were supplied by HAMAMATSU PHOTONICS K.K.

The optical filter provided in the photodiode block indicated by symbol 6 had a $\lambda_h$ of 1,293 nm and a $\lambda_h$ of 1,327 nm. The optical filter provided in the photodiode block indicated by symbol 7 had a $\lambda_h$ of 1,530 nm. The optical filter provided in the photodiode block indicated by symbol 10 had a $\lambda_h$ of 1,277 nm. The optical filter provided in the photodiode block indicated by symbol 11 had a $\lambda_h$ of 1,332 nm and a $\lambda_h$ of 1,366 nm.

Figure 2:
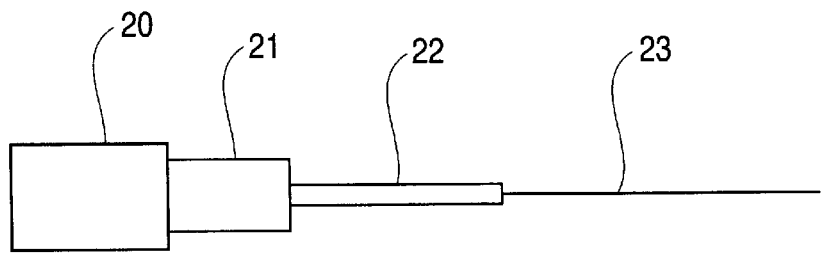
FIG. 2 schematically shows a laser diode block prepared in Example 1.

FIG. 2 shows a laser diode block.

In FIG. 2:

Symbol 20 indicates a laser diode.

Symbol 21 indicates a gradient index lens (a trade name "SELFOC" lens) for coupling a laser diode beam with an optical fiber.

Symbol 22 indicates a ferrule.

Symbol 23 indicates a 50/125 GI optical fiber (optical fiber belonging to the 1×4 coupler 1). These were all fixed with an adhesive.

Figure 3:
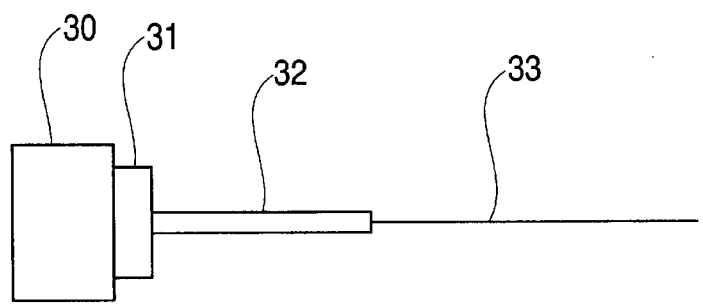
FIG. 3 schematically shows a photodiode block prepared in Example 1.

FIG. 3 shows a photodiode block.

In FIG. 3:

Symbol 30 indicates a photodiode.

Symbol 31 indicates an optical filter.

Symbol 32 indicates a ferrule.

Symbol 33 indicates a 50/125 GI optical fiber (optical fiber belonging to the 1×4 coupler 1). These were all fixed with an adhesive.

The above four-wavelength division multiplexing device was completed, and then one-port side optical fiber ends of the 1×4 coupler, i.e., the connector-attached optical fibers coupled with the optical connectors 2, were detached and connected to a power meter. Then, the laser diodes were allowed to emit light one after another, and the performance current quantities of the laser diodes were adjusted such that light intensities of all the laser diode beams were −5.0 dBm (for the convenience, the power in the above case will be referred to as "reference power" hereinafter, and the performance current for attaining the reference power will be referred to as "reference performance current" hereinafter). The environmental temperature was at 25° C.

Then, the one-port side optical fiber ends of the 1×4 couplers were connected to the optical connectors 2, and the laser diodes were allowed to emit light at the reference performance current one after another, to measure intensities of lights received by the photodiodes. For the convenience, when a laser diode m is allowed to emit light, the intensity of received light in a photodiode n is described as Pm/n.

The results are summarized below.

| | |
|---|---|
| P4/10 = −13.5 dBm | P4/11 = −40.1 dBm |
| P5/10 = −52.4 dBm | P5/11 = −13.7 dBm |
| P8/6 = −13.1 dBm | P8/7 = −44.6 dBm |
| P9/6 = −51.8 dBm | P9/7 = −14.2 dBm |

Combinations forming pairs (laser diode: photodiode) based on the constitutions of the optical filters were 4/10, 5/11, 8/6 and 9/7 when expressed by symbols, and in these combinations, light signals reached at a sufficient level. On the other hand, in the photodiodes forming no pair, almost no light reached.

Example 2

The whole of the four-wavelength division multiplexing device used in Example 1 was placed under an environment at 0° C., and the same measurements as those in Example 1 were conducted. In call the cases, the reference power was set at −5 dBm like that in Example 1.

The results are summarized below.

| | |
|---|---|
| P4/10 = −13.7 dBm | P4/11 = −41.2 dBm |
| P5/10 = −50.2 dBm | P5/11 = −13.8 dBm |
| P8/6 = −13.3 dBm | P8/7 = −41.3 dBm |
| P9/6 = −53.3 dBm | P9/7 = −14.0 dBm |

Example 3

The whole of the four-wavelength division multiplexing device used in Example 1 was placed under an environment at 50° C., and the same measurements as those in Example 1 were conducted. In call the cases, the reference power was set at −5 dBm like that in Example 1.

The results are summarized below.

| | |
|---|---|
| P4/10 = −13.3 dBm | P4/11 = −43.0 dBm |
| P5/10 = −46.5 dBm | P5/11 = −14.0 dBm |
| P8/6 = −13.6 dBm | P8/7 = −46.2 dBm |
| P9/6 = −49.8 dBm | P9/7 = −13.9 dBm |

Mainly in short-range information communication networks, the transmission capacity can be increased to make it approximately several times when existing optical fibers are utilized in an effective manner, and further, the temperature control of light sources is no longer necessary, so that a less expensive system can be constituted.

What is claimed is:

1. A wavelength division multiplexing device comprising: a pair of 1×N optical couplers ($2 \leq N \leq 16$), N light emission devices in which one of peak wavelengths thereof differs from every other one by at least 30 nm and N light receivers having optical filters having light-transmission wavelength bands adjusted to correspond to said peak wavelengths, wherein the light emission devices and the light receivers having optical filters corresponding to peak wavelengths of the light emission devices form pairs, said light emission devices or said light receivers are optically connected to N-port-side ports of one of the 1×N optical couplers, and each optical filter is defined by the following expression (1), $$|\lambda - \lambda_n| \geq 0.01\lambda + 2 \text{(nm)} \tag{1}$$

wherein $\lambda$ (nm) is a light wavelength of a light emission device, which is to form a pair with an optical filter, at a room temperature, and $\lambda_n$ (nm) is a wavelength corresponding to 50% of transmittance of the optical filter in an optical absorption curve near $\lambda$.

2. The wavelength division multiplexing device of claim 1, wherein the light emission devices are laser diodes and condenser lenses are provided before light emission sides thereof.

3. The wavelength division multiplexing device of claim 1, wherein the light receivers are photodiodes.

4. The wavelength division multiplexing device of claim 1, wherein the 1×N optical couplers are optical waveguides each of which is formed of a polymer film having a refractive index distribution.

5. The wavelength division multiplexing device of claim 1, wherein the light emission devices have peak wavelengths in the range of from 800 to 1,550 nm.

6. The wavelength division multiplexing device of claim 1, wherein each of the optical filters is at least one selected from the group consisting of a long wavelength path filter, a band path filter and a short wavelength path filter.

* * * * *